US010280552B2

United States Patent
Kulkarni (10) Patent No.: US 10,280,552 B2
(45) Date of Patent: May 7, 2019

(54) FILTER ASSEMBLY FOR A DRYER APPLIANCE

(71) Applicant: Haier US Appliance Solutions, Inc., Wilmington, DE (US)

(72) Inventor: Ashutosh Kulkarni, Bangalore (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 360 days.

(21) Appl. No.: 15/224,716

(22) Filed: Aug. 1, 2016

(65) Prior Publication Data

US 2018/0030645 A1    Feb. 1, 2018

(51) Int. Cl.
| | | |
|---|---|---|
| F26B 5/06 | (2006.01) |
| D06F 58/22 | (2006.01) |
| B01D 46/00 | (2006.01) |
| D06F 58/02 | (2006.01) |
| D06F 58/28 | (2006.01) |

(52) U.S. Cl.
CPC ......... *D06F 58/22* (2013.01); *B01D 46/0006* (2013.01); *B01D 46/0065* (2013.01); *B01D 46/0098* (2013.01); *D06F 58/02* (2013.01); *D06F 58/28* (2013.01); *D06F 2058/2806* (2013.01)

(58) Field of Classification Search
CPC .......................... D06F 58/22; B01D 46/0065
USPC ........................................... 34/292, 480, 82
See application file for complete search history.

(56) References Cited

U.S. PATENT DOCUMENTS

| | | | |
|---|---|---|---|
| 1,633,382 A * | 6/1927 | Koester ................... | D06F 57/00 15/256.6 |
| 4,700,492 A | 10/1987 | Werner et al. | |
| 5,497,563 A * | 3/1996 | Mayfield ................. | D06F 58/22 34/572 |
| 6,840,974 B2 * | 1/2005 | Bailey ................ | B01D 46/0056 361/679.49 |
| 9,187,860 B2 | 11/2015 | Masters | |
| 9,217,220 B2 * | 12/2015 | Ahn ........................ | D06F 58/22 |
| 2006/0201014 A1 * | 9/2006 | Favret ..................... | D06F 58/22 34/82 |
| 2008/0235978 A1 * | 10/2008 | Epstein ................... | D06F 58/22 34/82 |
| 2009/0064528 A1 * | 3/2009 | Kim ........................ | D06F 58/22 34/82 |

(Continued)

FOREIGN PATENT DOCUMENTS

WO    WO2011042345 A1    4/2011

*Primary Examiner* — John P McCormack
(74) *Attorney, Agent, or Firm* — Dority & Manning, P.A.

(57) ABSTRACT

A filter assembly for a dryer appliance is provided. The filter assembly includes a filter medium rotatably mounted within a filter cassette that is removably received within a filter slot of the dryer appliance. The filter medium has a first portion and a second portion that are selectively exposed to a stream of exhaust air from the dryer appliance to extract lint. While one portion is filtering lint, a lint removal system removes the lint from the other portion collected during the prior cycle. After each cycle, a motor is configured for rotating the filter medium to expose the clean portion of the filter. The filter cassette is removably received within the filter slot using a magnetic latching mechanism, a securing cover, or another suitable mechanism. A scrubber mechanism may also be used to remove stubborn lint.

20 Claims, 12 Drawing Sheets

(56) References Cited

U.S. PATENT DOCUMENTS

2015/0247278 A1\* 9/2015 Gregory .................. D06F 58/22
  34/480
2015/0337483 A1 11/2015 Ramprasad et al.
2016/0053428 A1\* 2/2016 Ros ........................ D06F 58/22
  34/82

\* cited by examiner

FILTER ASSEMBLY FOR A DRYER APPLIANCE

FIELD OF THE INVENTION

The present subject matter relates generally to dryer appliances, and more specifically to filter assemblies for dryer appliances.

BACKGROUND OF THE INVENTION

Dryer appliances are generally provided with a filter for collecting lint and other particles from air flowing through the dryer appliances. During a drying cycle, a large volume of lint can collect on the filter. Lint disposed on the filter can restrict air flow through the dryer appliance and negatively affect performance of the dryer appliance. For example, restricted air flow through a drum of the dryer appliance can raise a temperature of air within the drum and damage clothing articles within the drum. As another example, a thermostat or other temperature regulating device of the dryer appliance may trip due to the increased temperature within the drum causing the drying cycle to be extended. Thus, an efficiency of the dryer appliance may be negatively affected when excessive lint is disposed on the dryer appliance's filter.

As a result, users of dryer appliances are normally instructed to clean the filter and remove collected lint from the filter between drying cycles. However, it can be difficult and/or inconvenient to frequently remove lint from the filter, and certain consumers forget to regularly clean the filter and/or disregard the cleaning instructions. In addition, in certain circumstances objects such as dryer sheets, foreign materials, or other particles and debris can cause stubborn clogs in the lint filter which may be difficult to dislodge.

Accordingly, a dryer appliance with features for removing lint from a filter of the dryer appliance and storing the lint for multiple drying cycles would be useful. More specifically, a dryer appliance with features for automatically removing clogs and allowing for user to remove the filter for periodic dislodging of stubborn clogs would be particularly beneficial.

BRIEF DESCRIPTION OF THE INVENTION

The present subject matter provides a filter assembly for a dryer appliance. The filter assembly includes a filter medium rotatably mounted within a filter cassette that is removably received within a filter slot of the dryer appliance. The filter medium has a first portion and a second portion that are selectively exposed to a stream of exhaust air from the dryer appliance to extract lint. While one portion is filtering lint, a lint removal system removes the lint from the other portion collected during the prior cycle. After each cycle, a motor is configured for rotating the filter medium to expose the clean portion of the filter. The filter cassette is removably received within the filter slot using a magnetic latching mechanism, a securing cover, or another suitable mechanism. A scrubber mechanism may also be used to remove stubborn lint. Additional aspects and advantages of the invention will be set forth in part in the following description, or may be apparent from the description, or may be learned through practice of the invention.

In a first exemplary embodiment, a dryer appliance is provided including a cabinet defining a vent and a filter opening and a drum rotatably mounted within the cabinet, the drum defining a chamber for receipt of articles for drying. An exhaust conduit extends between the chamber of the drum and the vent of the cabinet and a filter slot extends from the filter opening into the exhaust conduit. The dryer appliance further includes a filter assembly including a filter cassette being removably received within the filter slot and a filter medium being rotatably mounted within the filter cassette, the filter medium having a first portion and a second portion. A motor is operably coupled to the filter medium to rotate the filter medium between a first position and a second position, the first portion of the filter medium being disposed within the exhaust conduit when the filter medium is in the first position, and the second portion of the filter medium being disposed within the exhaust conduit when the filter medium is in the second position.

In a second exemplary embodiment, a filter assembly for a dryer appliance is provided. The filter assembly includes a filter slot defined by the dryer appliance and a filter cassette being removably received within the filter slot. A filter medium is rotatably mounted within the filter cassette, the filter medium having a first portion and a second portion. A motor is operably coupled with the filter medium to rotate the filter medium between a first position and a second position, the first portion of the filter medium being disposed within an exhaust conduit when the filter medium is in the first position, and the second portion of the filter medium being disposed within the exhaust conduit when the filter medium is in the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
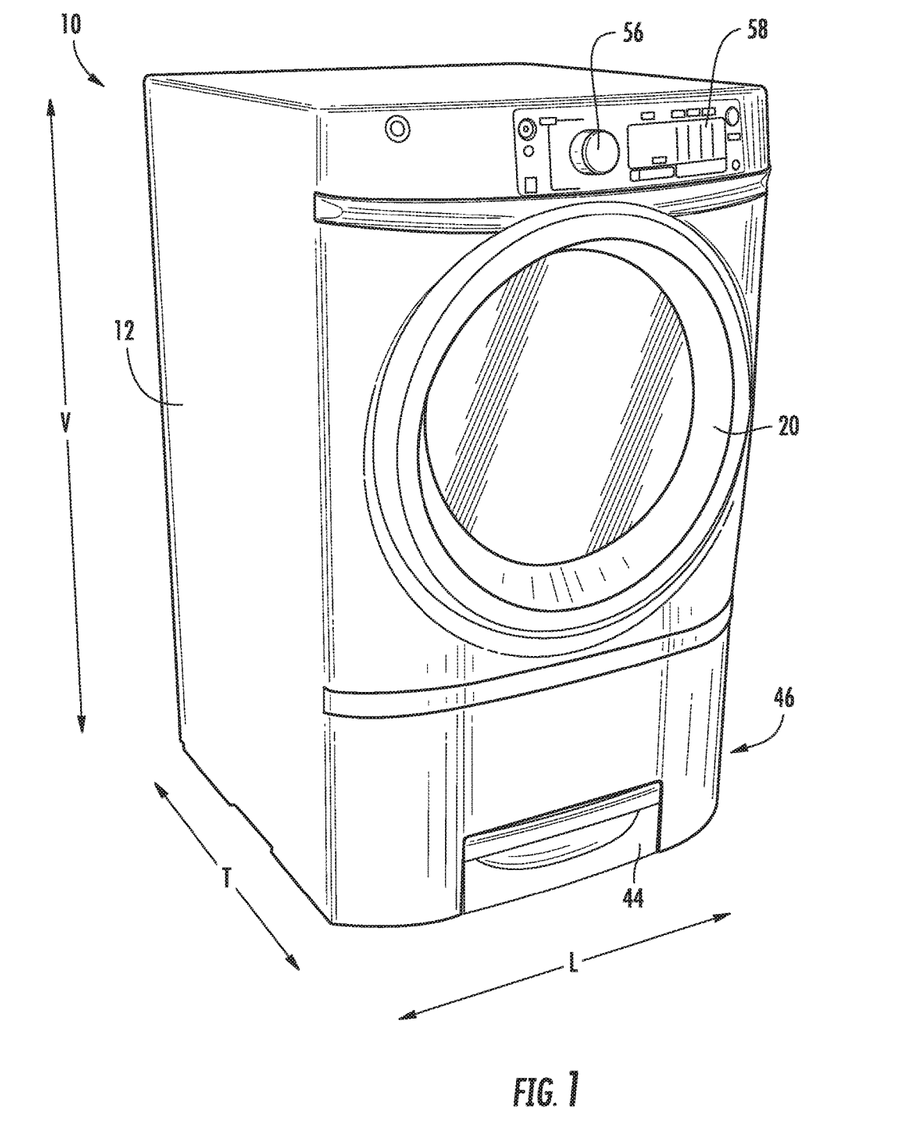
FIGS. 1 and 2 provide perspective views of a dryer appliance according to an exemplary embodiment of the present subject matter.
Figure 2:
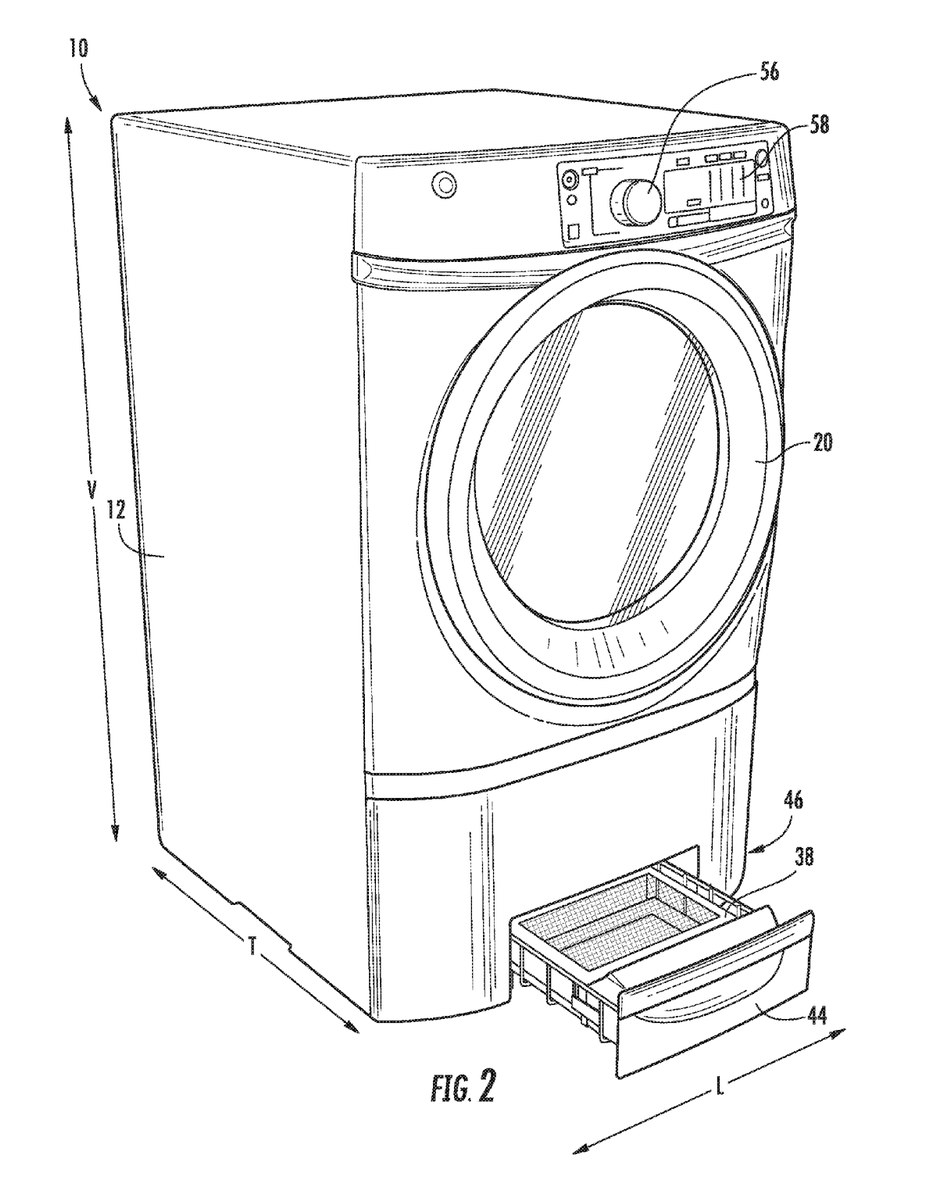

FIGS. 1 and 2 provide perspective views of a dryer appliance 10 according to an exemplary embodiment of the present subject matter. While described in the context of a specific embodiment of dryer appliance 10, using the teachings disclosed herein it will be understood that dryer appliance 10 is provided by way of example only. Other dryer appliances having different appearances and different features may also be utilized with the present subject matter as well. For example, dryer appliance 10 illustrated in FIGS. 1 and 2 is an electric dryer appliance with electric heating element for heating air. In alternative exemplary embodiments, dryer appliance 10 may be a gas dryer appliance with gas burners for heating air.

Dryer appliance 10 includes a cabinet 12. Within cabinet 12 is a drum or container 14 (FIG. 3) mounted for rotation about a substantially horizontal axis. Drum 14 is generally cylindrical in shape and defines a chamber 16 for receipt of articles for drying. Thus, clothing articles and other fabrics may be loaded into chamber 16 of drum 14 and dried therein, as discussed in greater detail below. A door 20 is rotatably mounted to cabinet 12 to permit selective access to chamber 16 of drum 14. As illustrated in the figures, dryer appliance 10 defines a vertical direction V, a lateral direction L, and a transverse direction T. The vertical direction V, the lateral direction L, and the transverse direction T are mutually perpendicular and form an orthogonal direction system.

A drawer 44 is mounted to cabinet 12 at a bottom portion 46 of cabinet 12. Drawer 44 is adjustable (e.g., slidable) between a closed position (FIG. 1) and an open position (FIG. 2). A lint collection bin 38 is removably mounted or positioned within drawer 44. Lint collection bin 38 is configured for collecting and storing lint therein, as discussed in greater detail below. A user of dryer appliance 10 may remove lint collection bin 38 from drawer 44 when drawer 44 is in the open position. With lint collection bin 38 removed from drawer 44, the user may remove lint from lint collection bin 38 and replace lint collection bin 38 within drawer 44 after cleaning lint collection bin 38. The user may adjust drawer 44 to return lint collection bin 38 to a suitable position for collecting lint during operation of dryer appliance 10. A poka-yoke arrangement between lint collection bin 38 and drawer 44 may assist with insuring that lint collection bin 38 is properly or suitably positioned within drawer 44 to capture lint during operation of dryer appliance 10.

Figure 3:
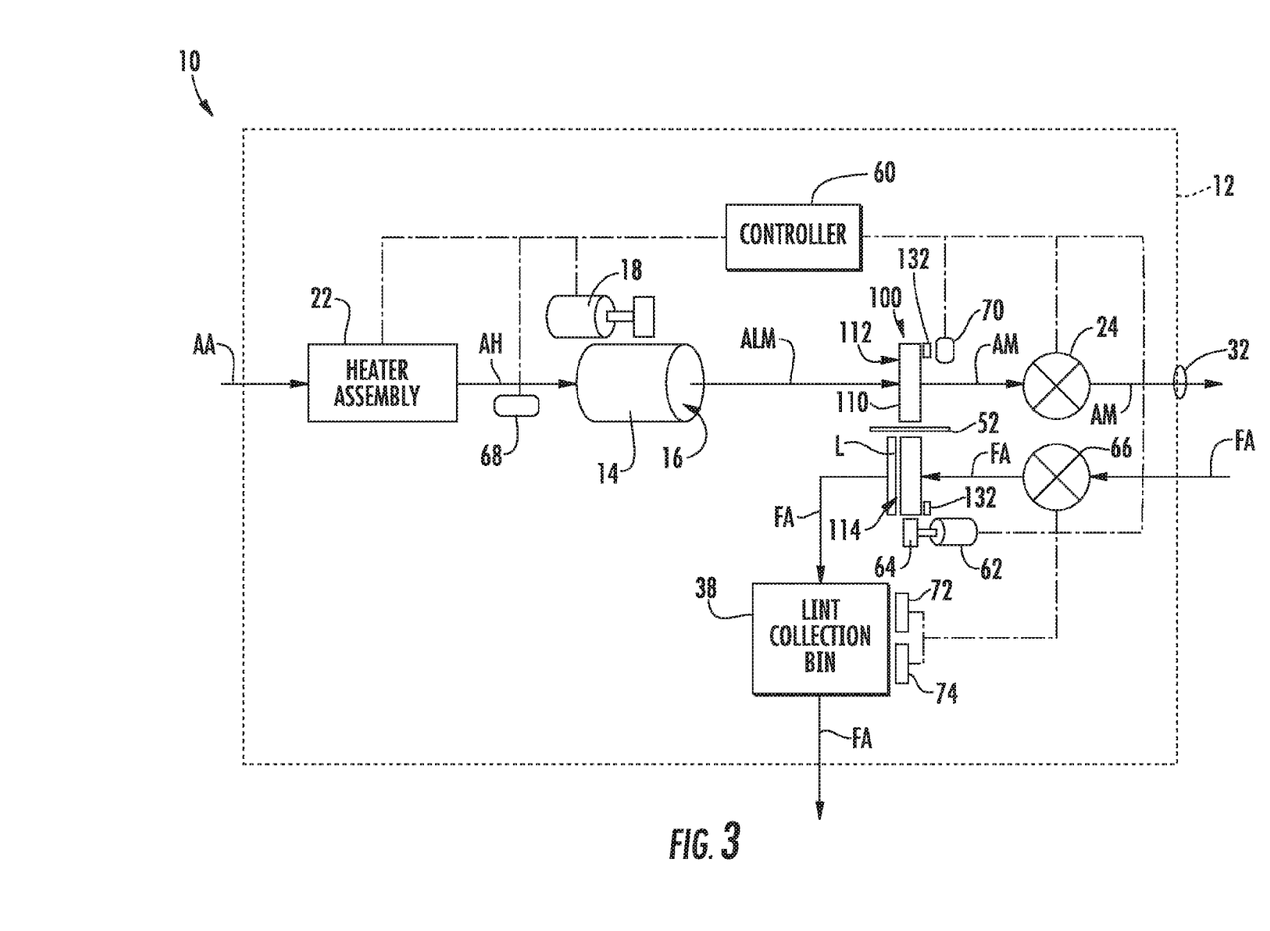
FIG. 3 provides a schematic view of certain components of the exemplary dryer appliance of FIG. 1.

FIG. 3 provides a schematic view of certain components of dryer appliance 10. As may be seen in FIG. 3, dryer appliance 10 includes drum 14 rotatably mounted within cabinet 12. A rear wall (not shown) of drum 14 may be rotatably supported within cabinet 12 by a suitable fixed bearing. A drum motor 18 rotates the drum 14 about a horizontal axis. For example, drum motor 18 may be coupled to drum 14 via a pulley and belt system or drum motor 18 may be directly coupled to drum 14 and directly drive drum 14. Drum motor 18 may also be in mechanical communication with an air handler 24 such that drum motor 18 rotates an impeller assembly (not shown) of air handler 24. Air handler 24 is configured for drawing air through chamber 16 of drum 14, e.g., in order to dry articles located therein as discussed in greater detail below. In alternative exemplary embodiments, dryer appliance 10 may include an additional motor (not shown) for operating air handler 24 independently of drum 14.

Drum 14 is configured to receive heated air that has been heated by a heater assembly 22, e.g., in order to dry damp articles disposed within chamber 16 of drum 14. As discussed above, during operation of dryer appliance 10, drum motor 18 rotates drum 14 and air handler 24 such that air handler 24 draws air through chamber 16 of drum 14. In particular, ambient air, shown with arrow AA, enters heater assembly 22 due to air handler 24 urging such ambient air AA into heater assembly 22. Such ambient air AA is heated within heater assembly 22 and exits heater assembly 22 as heated air, shown with arrow AH. Air handler 24 draws such heated air AH to drum 14. The heated air AH enters drum 14, e.g., through a plurality of holes (not shown) defined in drum 14.

Within chamber 16, the heated air AH accumulates moisture and lint, e.g., from damp articles disposed within chamber 16. In turn, air handler 24 draws lint and moisture laden air, shown as arrow ALM, from chamber 16 to a filter assembly 100 and filter medium 110 which traps lint L and removes lint particles from the lint and moisture laden air ALM. After filter assembly 100, moisture laden air, shown with arrow AM, is passed through air handler 24. From air handler 24, such moisture laden air AM passes out of clothes dryer 10 through a vent 32 defined by cabinet 12.

Turning back to FIGS. 1 and 2, dryer appliance 10 includes a cycle selector knob 56 mounted on a cabinet control panel 58. Cycle selector knob 56 and other control inputs of cabinet control panel 58 are in communication with a controller 60 (FIG. 3). Turning now to FIG. 3, signals generated in controller 60 operate drum motor 18 and heater assembly 22 in response to a position of selector knob 56. Alternatively, a touch screen type interface may be provided. Controller 60 may include a memory and one or more microprocessors, CPUs or the like, such as general or special purpose microprocessors operable to execute programming instructions or micro-control code associated with operation of dryer appliance 10. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 60 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 60 may be positioned in a variety of locations throughout dryer appliance 10. For example, controller 60 may be located at or adjacent cabinet control panel 58 in cabinet 12. In such an embodiment, input/output ("I/O") signals may be routed between controller 60 and various operational components of dryer appliance 10. As an example, the various operational components of dryer appliance 10 may be in communication with controller 60 via one or more signal lines or shared communication busses.

As discussed above, dryer appliance 10 includes filter assembly 100 for filtering air flowing through dryer appliance 10. Filter assembly 100 includes a filter medium 110 that is rotatable between a first position and a second position, e.g., on a shaft 52. Thus, shaft 52 may support filter medium 110 such that filter medium 110 is rotatable between the first and second positions. In addition, a filter motor 62 is coupled to filter medium 110. Filter motor 62 is operable, e.g., by or with controller 60, to rotate filter medium 110 between the first and second positions. Dryer appliance 10 also includes a fan 66 and lint collection bin 38. Fan 66 is operable, e.g., by or with controller 60, to direct a flow of air FA across or through filter medium 110 to remove lint L from filter medium 110, as discussed in greater detail below.

Filter assembly 100 also includes a pair of magnets 132 and a magnetic sensor 70, such as a Hall effect sensor, a reed switch or a magnetoresistive sensor. Magnets 132 and magnetic sensor 70 assist with establishing whether filter medium 110 is in the first position or the second position. As an example, one of magnets 132 may be positioned adjacent and trigger magnetic sensor 70 when filter medium 110 is in the first position, and another one of magnets 132 may be positioned adjacent and trigger magnetic sensor 70 when filter medium 110 is in the second position.

Dryer appliance 10 also includes a temperature sensor 68, such as a thermocouple or thermistor. Temperature sensor 68 is positioned for measuring or monitoring a temperature of air within chamber 16 of drum 14 or entering chamber 16 of drum 14, e.g., heated air AH. Controller 60 is configured for operating filter motor 62 to move filter medium 110, e.g., when a temperature measurement from temperature sensor 68 exceeds a threshold temperature, as discussed in greater detail below.

Dryer appliance 10 further includes a lint collection bin fullness sensor 72 and a lint collection bin detection sensor 74. Lint collection bin fullness sensor 72 is positioned and configured for establishing whether lint collection bin 38 is full of lint L, e.g., by measuring a volume of lint L in lint collection bin 38 and/or determining when the volume of lint L in lint collection bin 38 exceeds a threshold volume. Lint collection bin fullness sensor 72 may be any suitable type of sensor for determining whether lint collection bin 38 is full. For example, lint collection bin fullness sensor 72 may be an optical sensor, a pressure switch, etc. Lint collection bin detection sensor 74 is positioned and configured for establishing whether lint collection bin 38 is properly positioned within drawer 44. Lint collection bin detection sensor 74 may be any suitable type of sensor for determining whether lint collection bin 38 is properly positioned within drawer 44. For example, lint collection bin detection sensor 74 may be an optical sensor, a contact switch, a pressure switch, etc.

Figure 4:
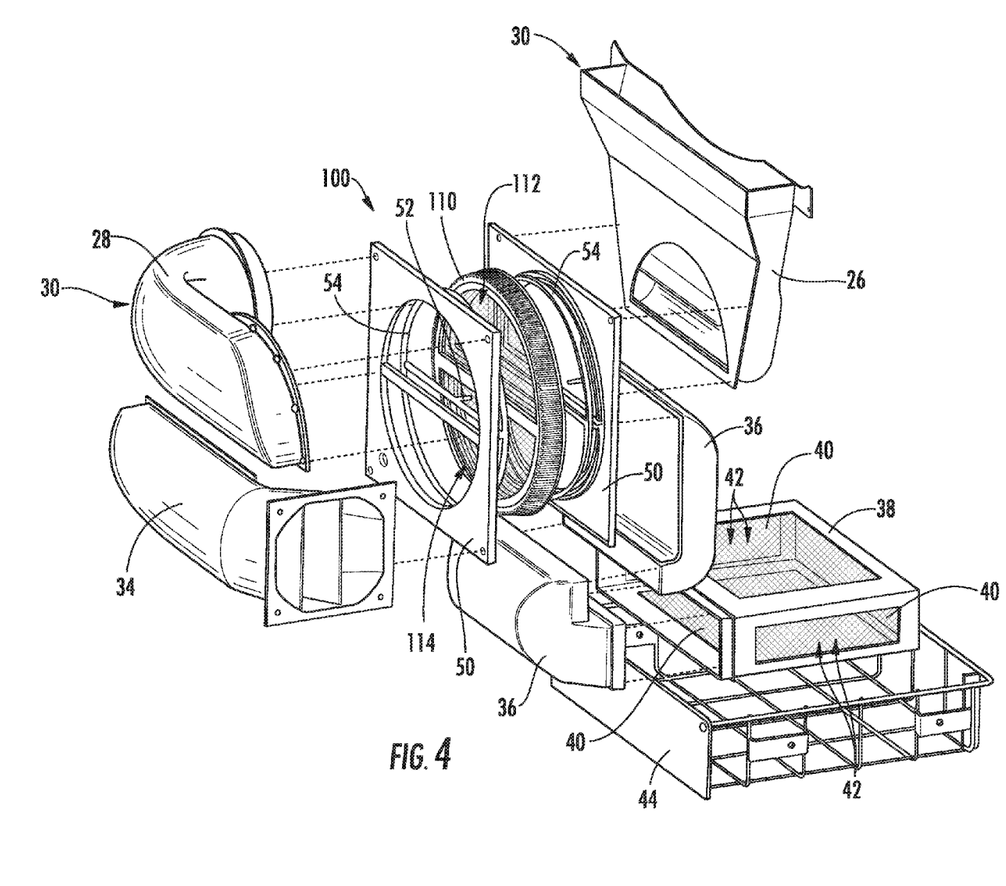
FIG. 4 provides an exploded view of various components of the exemplary dryer appliance of FIG. 1 including a filter assembly of the dryer appliance according to an exemplary embodiment of the present subject matter.

FIG. 4 provides an exploded view of various components of dryer appliance 10 including filter assembly 100. As may be seen in FIG. 4, dryer appliance 10 includes a front duct 26 and an exhaust duct 28 that assist with forming an exhaust conduit 30 that extends between and connects chamber 16 of drum 14 and vent 32 (FIG. 3). Exhaust conduit 30 places chamber 16 of drum 14 and vent 32 in fluid communication in order to permit moisture laden air AM to exit dryer appliance 10. Thus, air may flow through exhaust conduit 30 from chamber 16 of drum 14 to vent 32 of cabinet 12 and exit dryer appliance 10 at vent 32 of cabinet 12.

Filter assembly 100 is positioned at exhaust conduit 30. Filter assembly 100 is configured for filtering air flowing through exhaust conduit 30. In particular, filter assembly 100 may remove or trap lint or other particles from air flowing through exhaust conduit 30.

As may be seen in FIG. 4, filter medium 110 of filter assembly 100 has a first portion 112 and a second portion 114. As discussed above, filter medium 110 is rotatable between the first and second positions. First portion 112 of filter medium 110 is disposed within or at exhaust conduit 30 when filter medium 110 is in the first position. Conversely, second portion 114 of filter medium 110 is disposed within or at exhaust conduit 30 when filter medium 110 is in the second position. Thus, either of first and second portions 112 and 114 of filter medium 110 may be selectively positioned within exhaust conduit 30 in order to filter air flowing through exhaust conduit 30 with either of first and second portions 112 and 114 of filter medium 110.

Figure 5:
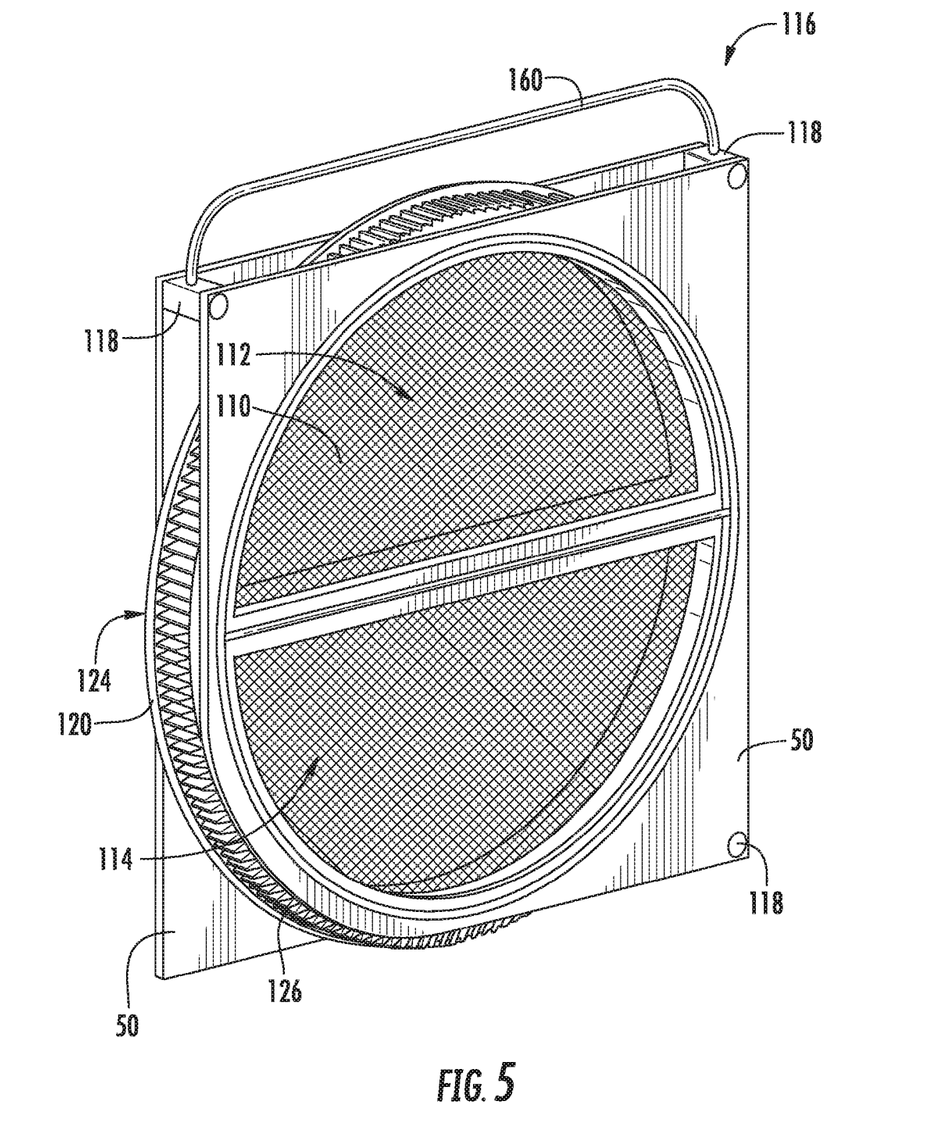
FIG. 5 provides a perspective view of a filter cassette that may be used with the exemplary filter assembly of FIG. 4.

As best illustrated in FIGS. 4 and 5, filter medium 110 is rotatably mounted within a filter cassette 116. In particular, filter medium 110 is disposed between plates 50, and shaft 52 extends through filter medium 110 between plates 50. Gaskets 54 also extend between plates 50 and filter medium 110. Gaskets 54 assist with containing heated air within exhaust conduit 30 and hinder or prevent leaks therefrom. Plates 50 define passages, e.g., that correspond to or complement first and second portions 112 and 114 of filter medium 110. A plurality of spacers 118 may be securely fixed between plates 50, such that filter medium 110 may be mounted between plates 50 with little resistance preventing its rotation on shaft 52.

Referring again to FIG. 4, dryer appliance 10 also includes a supply duct 34. Fan 66 (FIG. 3) may be positioned at and/or mounted to supply duct 34. In particular, supply duct 34 may extend between fan 66 and filter medium 110 such that fan 66 directs flow of air FA across or through filter medium 110 to remove lint L from filter medium 110. In particular, fan 66 is operable, e.g., by or with controller 60, to direct flow of air FA through supply duct 34 across second portion 114 of filter medium 110 when filter medium 110 is in the first position or to direct flow of air FA through supply duct 34 across first portion 112 of filter medium 110 when filter medium 110 is in the second position. Lint collection bin 38 is disposed downstream of filter medium 110 relative to flow of air FA from fan 66. For example, a lint duct 36 extends between filter medium 110 and lint collection bin 38. Lint L from filter medium 110 may be directed from filter medium 110 to lint collection bin 38 through lint duct 36. For example, flow of air FA from fan 66 may blow lint L off filter medium 110, and lint L may flow through lint duct 36 to lint collection bin 38. Thus, lint collection bin 38 is configured for collecting lint L blown off filter medium 110 by flow of air FA.

As may be seen in FIG. 4, lint collection bin 38 includes mesh walls 40. Mesh walls 40 define a plurality of outlet holes 42. Flow of air FA exits lint collection bin 38 through outlet holes 42. Outlet holes 42 may be sized for hindering lint L from passing therethrough. Thus, mesh walls 40 may trap lint L within lint collection bin 38 while permitting flow of air FA to exit lint collection bin 38. Lint collection bin 38 may have any suitable size. For example, lint collection bin 38 may be sized for collecting lint for at least ten drying cycles of dryer appliance 10, for at least twenty drying cycles of dryer appliance 10, etc. without requiring or needing a user of dryer appliance 10 to empty or service lint collection bin 38.

Figure 6:
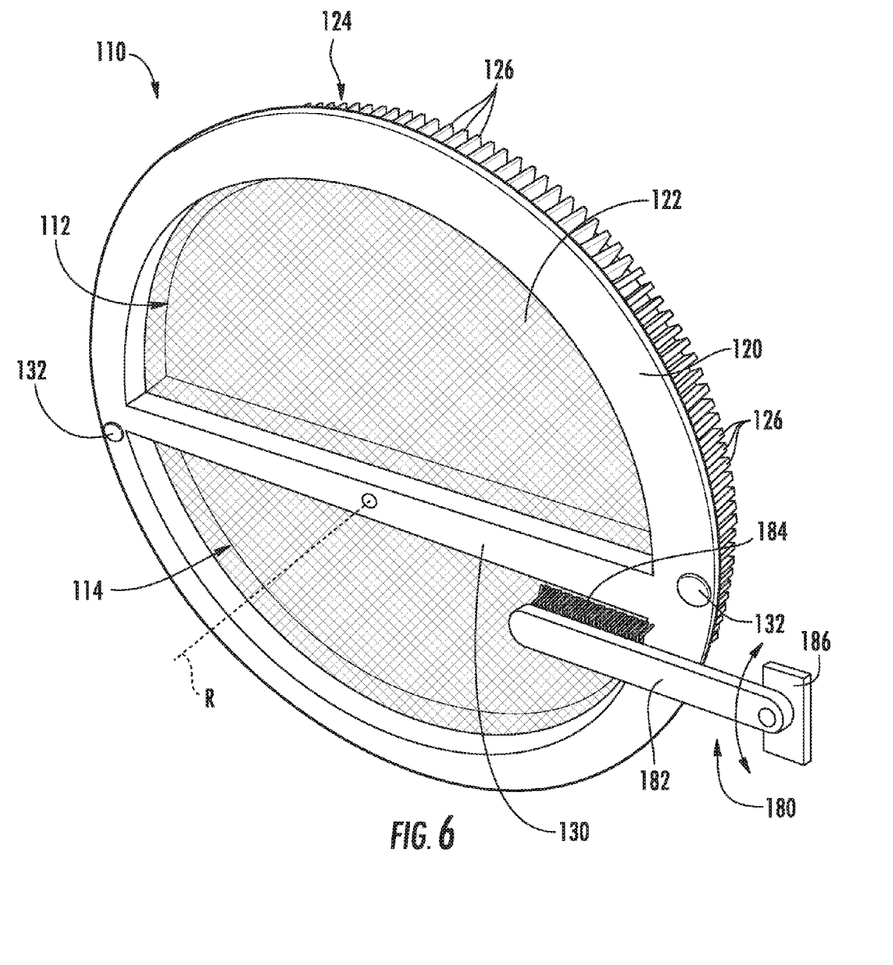
FIG. 6 provides a perspective view of a filter medium and a scrubber mechanism the exemplary filter assembly of FIG. 4 according to an exemplary embodiment of the present subject matter.
Figure 7:
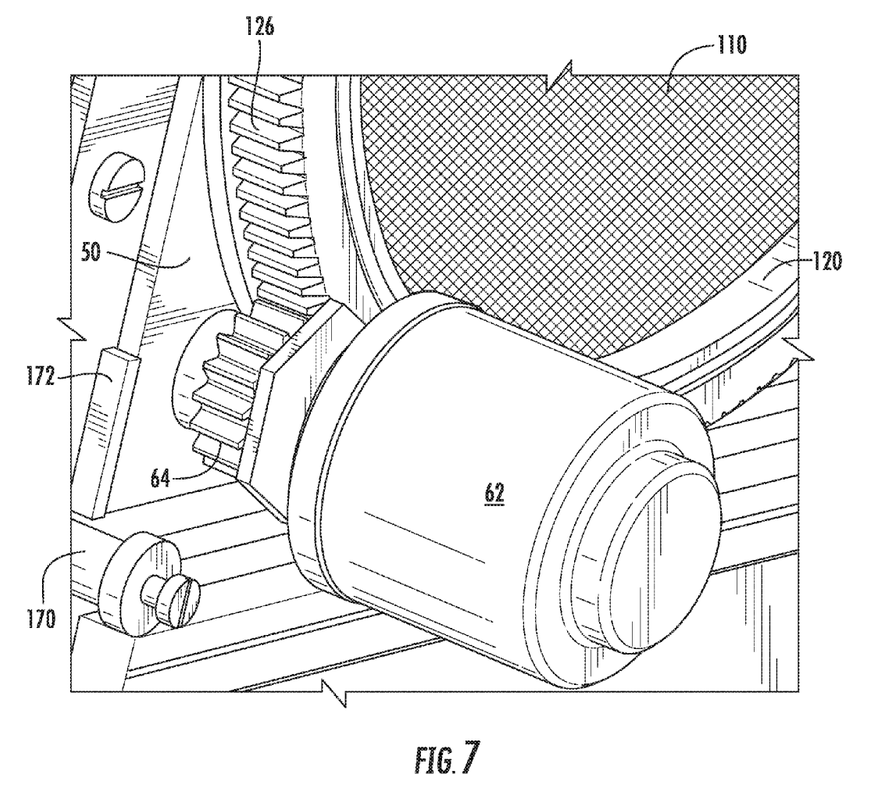
FIG. 7 provides a perspective view of a motor engaging the filter medium of the exemplary filter assembly of FIG. 4.

Referring now to FIGS. 5 through 7, filter cassette 116 and filter medium 110 will be described in more detail. FIG. 5 provides a perspective view of filter cassette 116. FIG. 6 provides a perspective view of filter medium 110 of filter assembly 100. FIG. 7 provides a perspective view of filter motor 62 operably engaging filter medium 110, as described below.

According to the illustrated exemplary embodiment, filter medium 110 includes a frame 120 and a mesh or screen 122 disposed within frame 120. For example, screen 122 may be sandwiched between two portions of frame 120. Screen 122 may be any suitable screen. For example, screen 122 may be a metal screen or mesh, such as aluminum or steel screen, or a nylon screen. Frame 120 may have any suitable shape. For example, frame 120 may have a circular shape, e.g., in a plane that is perpendicular to an axis of rotation R of filter medium 110, and a middle beam 130 of frame 120 may bisect the interior area of frame 120. Thus, first and second portions 112 and 114 of filter medium 110 may have a semicircular shape, e.g., in the plane that is perpendicular to an axis of rotation R of filter medium 110.

Frame 120 may include or define a plurality of teeth 126. Teeth 126 may be disposed about an outer edge 124 of frame 120, e.g., about or at a circumference of frame 120 when frame 120 has a circular shape. Teeth 126 assist with coupling filter medium 110 to filter motor 62. For example, filter motor 62 may include a gear 64 (FIG. 3), and gear 64 of filter motor 62 may mesh with teeth 126 of frame 120 in order to couple filter motor 62 to filter medium 110 and permit filter motor 62 to rotate filter medium 110 between the first and second positions. According to the illustrated embodiment, plate 50 on the front side of filter cassette 116 is cutaway such that it forms a radius that allows gear 64 to engaged teeth 126.

A first one of magnets 132 is mounted to frame 120 at or adjacent first portion 112 of filter medium 110, and a second one of magnets 132 is mounted to frame 120 at or adjacent second portion 114 of filter medium 110. As explained above, filter assembly 100 also includes a magnetic sensor 70, such as a Hall effect sensor, a reed switch or a magnetoresistive sensor, which can assist with establishing whether filter medium 110 is in the first position or the second position. Thus, the position of magnets 132 on frame 120 can assist with determining whether filter medium 110 is in the first or second positions.

Figure 8:
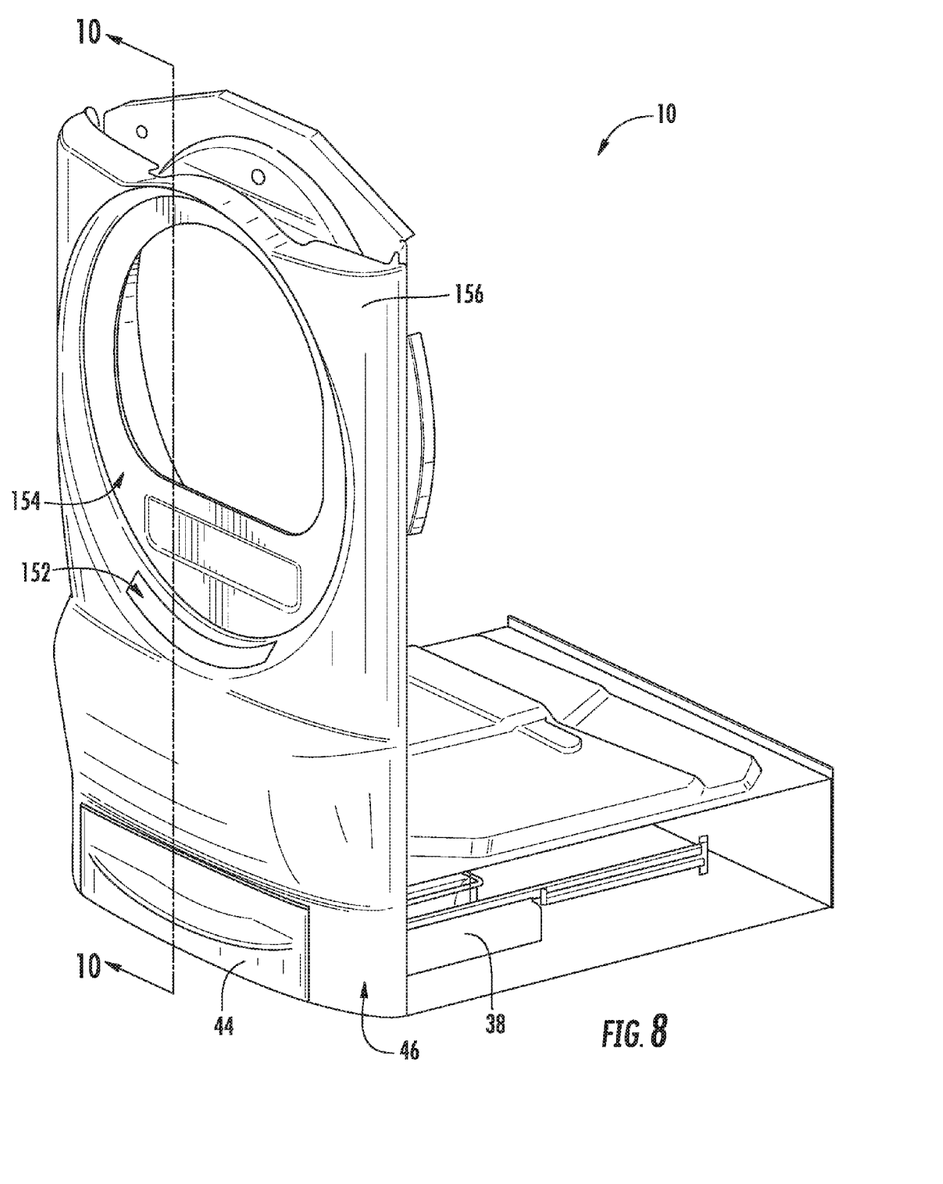
FIG. 8 provides a perspective view of various components of the exemplary dryer appliance of FIG. 1, with the door removed to reveal a filter opening according to an exemplary embodiment of the present subject matter.
Figure 9:
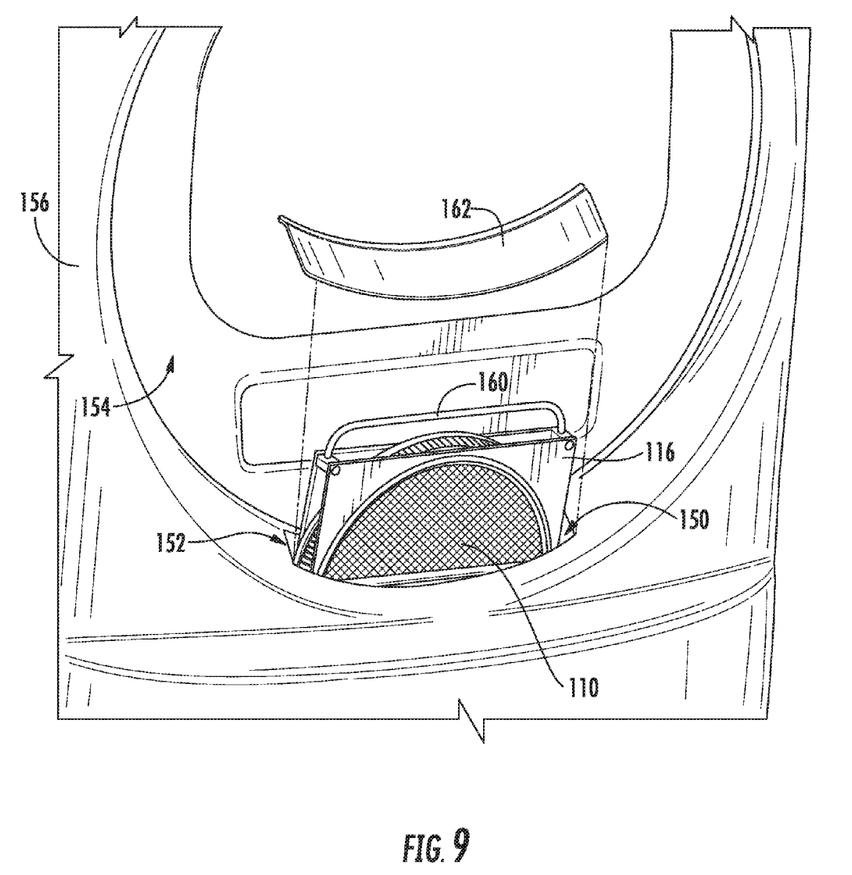
FIG. 9 provides a perspective view of the exemplary dryer appliance of FIG. 1, with the filter cassette being removed from the filter opening.
Figure 10:
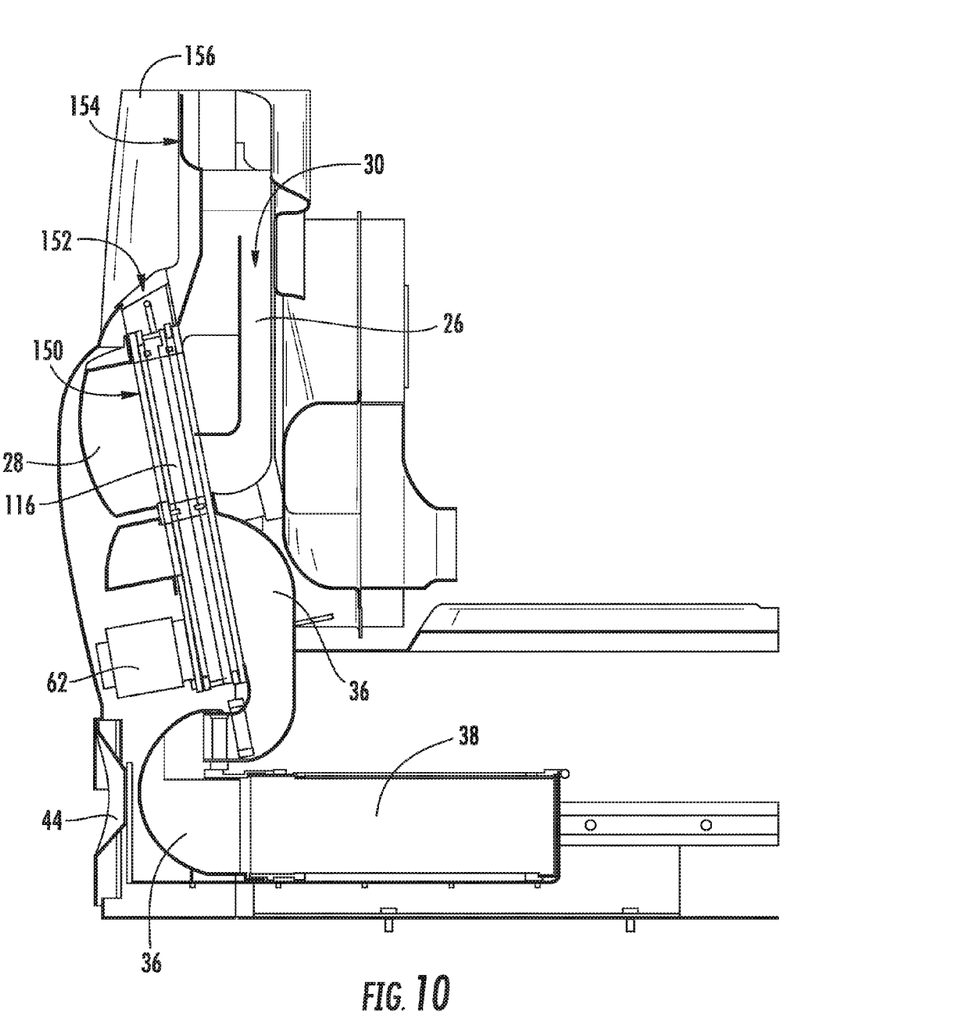
FIG. 10 provides a cross sectional view of the exemplary dryer appliance of FIG. 1, taken along Line 10-10 of FIG. 8.

Referring now to FIGS. 8 through 10, the exemplary dryer appliance 10 defines a filter slot 150 which is configured for receiving filter cassette 116. During operation of dryer appliance 10, filter cassette 116 is positioned within filter slot 150 and filters lint passing through exhaust conduit 30 as described above. Between cycles or at other periodic intervals, filter medium 110 may rotate within filter cassette 116 as described above to allow for lint removal from the first and second portions 112, 114 of filter medium 110. The removed lint may then be discharged into lint collection bin 38.

However, in certain circumstances, lint and other debris may become stuck onto filter medium 110 such that the flow of air FA from fan 66 is not sufficient to dislodge it. For example, when a dryer sheet is used during a drying cycle, the sheet may disintegrate or fall apart, thereby changing the tension properties of the lint mixture on filter medium 110. In addition, lint from uncommon fabrics, debris that inadvertently falls from a pocket of clothing being dried, or other particles extracted from the dryer chamber may result in a clogged filter medium 110. Aspects of filter assembly 100 described herein may assist in removing this stubborn debris.

Referring now specifically to FIG. 8, door 20 of dryer appliance 10 has been removed to reveal a filter opening 152 defined in cabinet 12. More specifically, filter opening 152 is defined within a door recess 154 of a front panel 156 of cabinet 12. In this manner, filter opening 152 may be concealed by door 20 when it is in the closed position. Although filter opening 152 is illustrated as being positioned within door recess 154, it should be appreciated that filter opening 152 may be positioned at any other suitable location on dryer appliance 10. For example, according to alternative embodiments, filter opening 152 may be placed elsewhere on front panel 156 of cabinet 12. According to still other exemplary embodiments, filter opening 152 may be positioned on any suitable surface of dryer appliance 10 that allows a user to access filter assembly 110 as discussed below.

As shown in FIGS. 9 and 10, filter opening 152 is configured to allow a user to access filter slot 150, e.g., to remove filter cassette 116. More specifically, filter slot 150 is configured to slidably receive filter cassette 116. In this regard, filter cassette 116 may have a shape corresponding to the shape of filter slot 150 such that it may be securely received therein. In the illustrated embodiment, filter cassette 116 has a substantially rectangular shape. To assist in inserting and removing filter cassette 116, a handle 160 may be attached along a top side of filter cassette 116. In this manner, handle 160 is easily accessible through filter opening 152 to facilitate easy removal of filter cassette 116 from filter slot 150. However, according to alternate embodiments, no handle is needed, and a user may simply grab filter cassette 116 and pull to remove it from filter slot 150.

Figure 13:
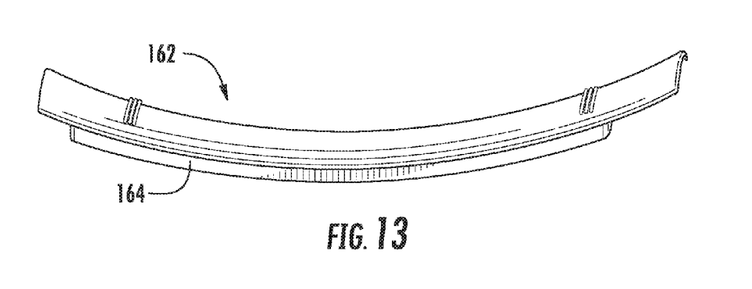
FIG. 13 provides a cover of the filter opening defined by the exemplary dryer appliance of FIG. 1.

According to the illustrated exemplary embodiment, a cover 162 may be removably attached to cabinet 12 over filter opening 152 to selectively allow and prevent access to filter slot 150 through filter opening 152. A user may remove cover 162, e.g., by sliding it away from filter opening 152, to reveal filter slot 150. Once removed, filter cassette 116 may be removed, e.g., for cleaning, replacement, etc. After replacing filter cassette 116 in filter slot 150, cover 162 may be reinstalled over filter opening 152 to secure filter cassette 116 within filter slot 150. As best illustrated in FIG. 13, cover 162 may define a protruding structure 164 that is configured to push filter cassette 116 into filter slot 150. In this manner, protruding structure 164 may be configured to press filter cassette 116 down into filter slot 150 to ensure full engagement between teeth 126 of filter medium 110 and gear 64 of filter motor 62.

Figure 11:
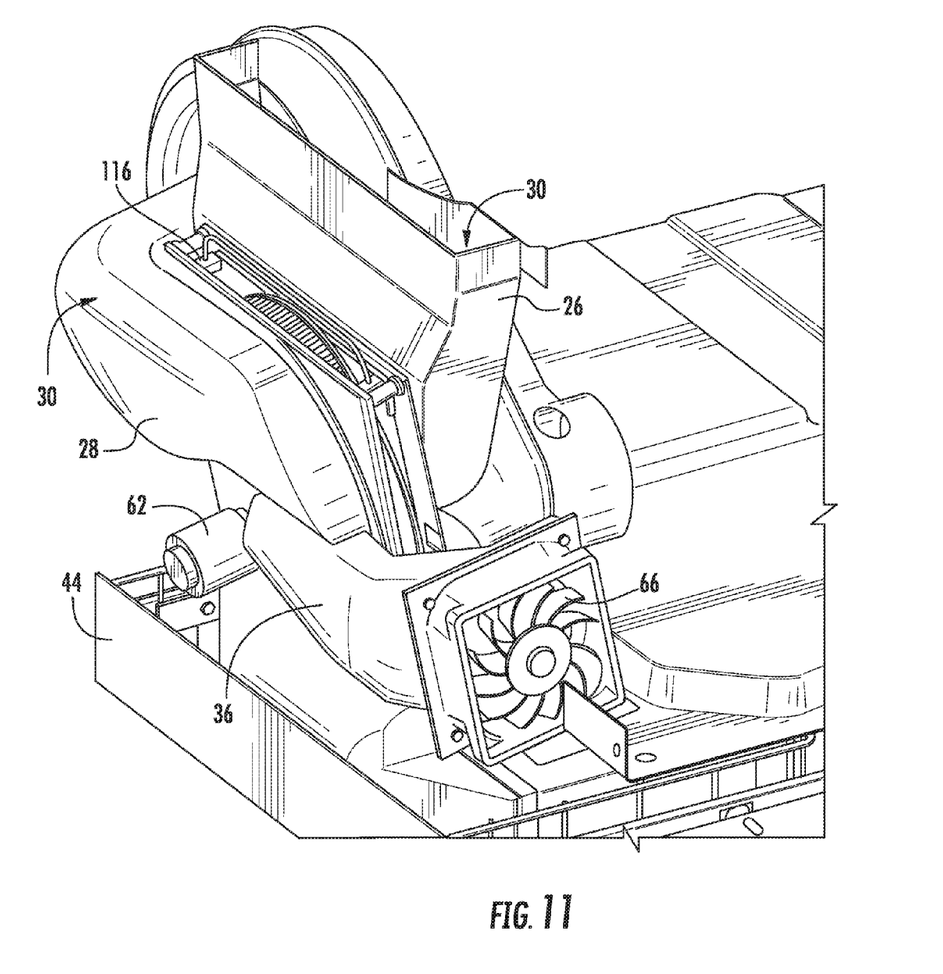
FIG. 11 provides a perspective view of various components of the exemplary filter assembly of FIG. 4 inserted into a filter slot of the exemplary dryer appliance of FIG. 1.
Figure 12:
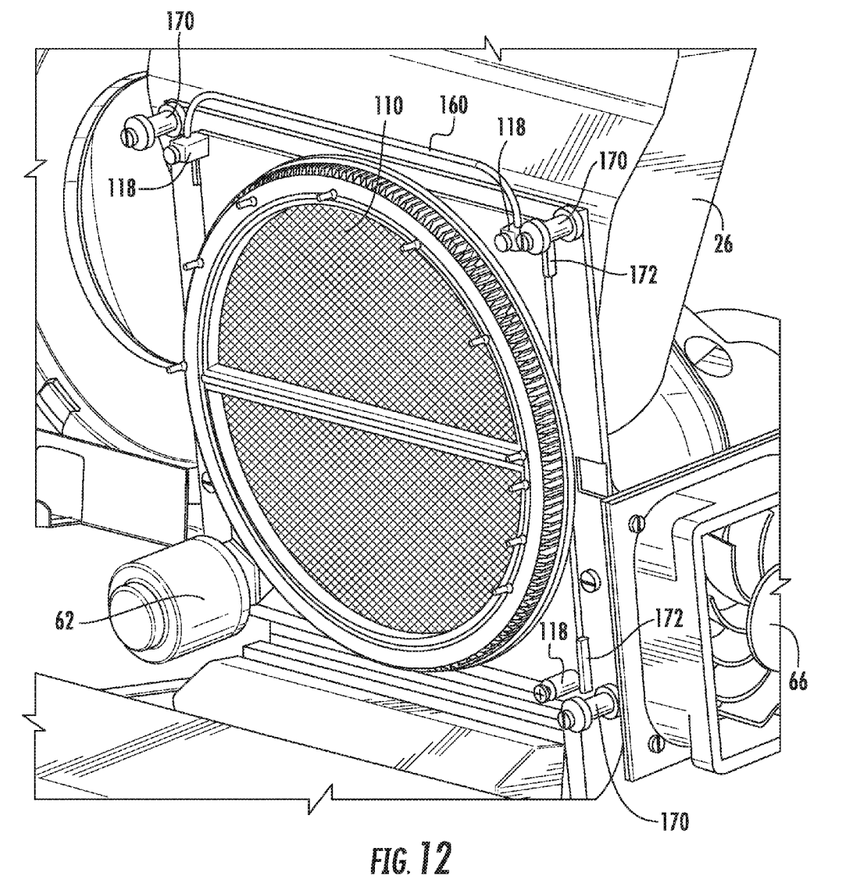
FIG. 12 provides a perspective view of the exemplary filter assembly of FIG. 4 with portions removed for clarity.

A plurality of guide pins 170 may be positioned along the lateral sides of filter slot 150 in order to guide filter cassette 116 into filter slot 150. For example, according to the illustrated embodiment, guide pins 170 are positioned at each of the four corners of filter slot 150. Guide pins 170 on the left and right side are spaced apart along the lateral direction L by a distance substantially equivalent to the width of filter cassette 116. In this manner, filter cassette 116 fits snugly within filter slot 150 and filter motor 62 has a reduced tendency to push filter cassette 116 out of filter slot 150 when rotating filter medium 110. As illustrated, guide pins 170 are rigid plastic or steel pins that have a smooth surface to facilitate sliding of filter cassette 116. However, alternative embodiments may use rollers, slide brackets, or any other suitable mechanism for providing a low friction track for filter cassette 116 to slide into filter slot 150.

In addition, filter assembly 100 may include one or more magnets configured for securing filter cassette 116 within filter slot 150. For example, according to the illustrated embodiment, filter assembly 100 includes four electromagnets 172 positioned adjacent the four guide pins 170 and filter cassette 116 may be formed at least in part from a ferromagnetic material. Each of the electromagnets 172 may be electrically connected to a controller, e.g., controller 60, which may be used to energize the electromagnets 172 to secure filter cassette 116 in filter slot 150. By contrast, when a user wishes to remove filter cassette 116, a button may be pressed or another indication may be provided to controller 60 to de-energize electromagnets 172, such that filter cassette 116 may be easily removed from filter slot 150.

Although four electromagnets 172 are illustrated, it should be appreciated that any type or number of magnets may be used to secure filter cassette 116 within filter slot 150. For example, according to an alternative embodiment, a single permanent magnet may be placed at a bottom of filter slot 150 such that it attracts a bottom of filter cassette 116 as it is fully inserted into filter slot. To remove filter cassette 116, a user may simply pull on handle 160 of filter cassette 116 to overcome the force of the permanent magnet and remove filter cassette 116.

Referring again to FIG. 6, a scrubber mechanism 180 for removing stubborn lint will be described. In general, scrubber mechanism 180 may be any mechanism configured for contacting filter medium 110 and facilitating the removal of lint. For example, according to the illustrated embodiment, scrubber mechanism 180 is a wire brush, i.e., an elongated arm 182 with wire bristles 184 extending towards filter medium 110. Wire bristles 184 may be plastic, steel, or any other suitable material, and may be straight, curved, contoured, etc. Scrubber mechanism 180 operates to remove at least a portion of lint from filter medium 110 that a flow of air FA is otherwise unable to dislodge. Once a portion of the lint is removed, the surface tension of the lint blockage may be broken, such that the flow of air FA is more effective at removing the remainder of the lint. Thus, scrubber mechanism 180 need not contact a large portion of filter medium 110, but may instead be a small brush contacting only a small portion.

Notably, it may not be desirable to have scrubber mechanism 180 contacting filter medium 110 at all times, e.g., to reduce unnecessary wear of filter medium 110 and scrubber mechanism 180. Therefore, filter assembly 100 may further include a scrubber drive mechanism 186 for moving scrubber mechanism 180 into and out of engagement with the surface of filter medium 110. For example, a four-bar linkage system, a solenoid arrangement, a motor drive, or any other suitable means for moving scrubber mechanism 180 may be used to pivot or move scrubber mechanism 180 into and out of contact with filter medium 110.

Controller 60 may be configured to engage scrubber mechanism 180 when a particular pressure or temperature or pressure increase is detected within chamber 16 and/or when filter motor 62 is rotating filter frame 120. For example, when temperature sensor 68 senses that the temperature within chamber 16 exceeds a predetermined threshold, filter motor 62 may rotate filter medium 110 between the first position and the second position. As filter medium 110 is rotated, controller 60 may engage scrubber mechanism 180 such that elongated arm 182 pivots toward filter medium 110 and wire bristles 184 scrape against the lint-covered side of filter medium 110. As filter medium 110 rotates, wire bristles 184 clear a portion of the lint, breaking the surface tension of the captured lint and allowing the flow of air FA to dislodge the remaining clogged lint from filter medium 110.

According to an exemplary embodiment, fan 66 is a two-speed fan. The low speed may be used to dislodge lint under normal conditions. However, when the flow of air FA generated by fan 66 operating at low speed is insufficient to dislodge stubborn lint, controller 60 may increase the speed of fan 66 to provide more dislodging force. This increase in the speed of fan 66 may be used independently of, or in conjunction with, the engagement of scrubber mechanism 180 to remove lint. Although fan 66 is described herein as being a two-speed fan, it should be appreciated that a fan with more than two speeds or an infinite speed fan could be used with alternative embodiments.

Using the above described features, filter assembly 100 may be used to quickly and conveniently remove lint from filter medium 110 with little to no user intervention. When a dryer sheet or other debris results in a lint clog in filter medium 110 which is not dislodged by normal operation of fan 66, controller 60 may detect this condition and implement corrective action. For example, the corrective action may involve one or both of increasing the speed of fan 66 or engaging scrubber mechanism 180. In addition, a user may access filter slot 150 through filter opening 152. In this manner, filter cassette 116 may be removed periodically for periodic maintenance or to remove a stubborn lint clog.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A filter assembly for a dryer appliance, the filter assembly comprising:
   a filter slot defined by the dryer appliance;
   a filter cassette being removably received within the filter slot;
   a filter medium being rotatably mounted within the filter cassette, the filter medium having a first portion and a second portion; and
   a motor operably coupled with the filter medium to rotate the filter medium between a first position and a second position, wherein only the first portion of the filter medium is disposed within an exhaust conduit when the filter medium is in the first position, and only the second portion of the filter medium is disposed within the exhaust conduit when the filter medium is in the second position.

2. The filter assembly of claim 1, wherein the filter cassette comprises a circular frame including a plurality of teeth disposed about a circumference of the circular frame, the motor having a gear meshed with the plurality of teeth of the circular frame to couple the motor to the filter medium, and wherein the first and second portions of the filter medium have a semicircular shape and are disposed within the circular frame.

3. The filter assembly of claim 1, wherein the filter assembly further comprises a plurality of guide pins positioned along sides of the filter slot, the guide pins configured to align the filter cassette within the filter slot.

4. The filter assembly of claim 1, wherein the filter assembly further comprises an electromagnet that is positioned within the filter slot, the electromagnet being energized to secure the filter cassette in the filter slot and being de-energized to allow the filter cassette to be removed from the filter slot.

5. The filter assembly of claim 1, wherein the filter assembly further comprises a scrubber mechanism for removing lint from the filter medium, the scrubber mechanism operable to engage the second portion of the filter medium when the filter medium is in the first position or to engage the first portion of the filter medium when the filter medium is in the second position.

6. The filter assembly of claim 1, wherein the filter assembly further comprises a cover, the cover being removably attachable to a cabinet over a filter opening to secure the filter cassette within the filter slot, the cover defining a bottom surface defining a protruding structure configured to push the filter cassette into engagement with the motor when installed.

7. A dryer appliance, comprising:
a cabinet defining a vent and a filter opening;
a drum rotatably mounted within the cabinet, the drum defining a chamber for receipt of articles for drying;
an exhaust conduit extending between the chamber of the drum and the vent of the cabinet;
a filter slot extending from the filter opening into the exhaust conduit; and
a filter assembly comprising:
a filter cassette being removably received within the filter slot;
a filter medium being rotatably mounted within the filter cassette, the filter medium having a first portion and a second portion; and
a motor operably coupled to the filter medium to rotate the filter medium between a first position and a second position, wherein only the first portion of the filter medium is disposed within the exhaust conduit when the filter medium is in the first position, and only the second portion of the filter medium is disposed within the exhaust conduit when the filter medium is in the second position.

8. The dryer appliance of claim 7, wherein the filter cassette comprises a circular frame, the filter medium being disposed within the circular frame, and the first and second portions of the filter medium having a semicircular shape.

9. The dryer appliance of claim 8, wherein the circular frame comprises a plurality of teeth disposed about a circumference of the circular frame, the motor having a gear meshed with the plurality of teeth of the circular frame to couple the motor to the filter medium.

10. The dryer appliance of claim 7, wherein the filter assembly further comprises a plurality of guide pins positioned along sides of the filter slot, the guide pins configured to align the filter cassette within the filter slot.

11. The dryer appliance of claim 7, wherein the filter assembly further comprises a magnet positioned within the filter slot, the magnet configured to secure the filter cassette in a fully engaged position.

12. The dryer appliance of claim 11, wherein the magnet is an electromagnet that is energized to secure the filter cassette in the filter slot and is de-energized to allow the filter cassette to be removed from the filter slot.

13. The dryer appliance of claim 7, wherein the filter assembly further comprises a scrubber mechanism for removing lint from the filter medium, the scrubber mechanism operable to engage the second portion of the filter medium when the filter medium is in the first position or to engage the first portion of the filter medium when the filter medium is in the second position.

14. The dryer appliance of claim 13, wherein the scrubber mechanism is a wire brush that is pivotally mounted to the filter assembly, the wire brush configured for pivoting between a disengaged position and an engaged position.

15. The dryer appliance of claim 7, wherein the filter opening is positioned on a front of the cabinet.

16. The dryer appliance of claim 7, wherein the filter assembly further comprises a cover, the cover being removably attachable to the cabinet over the filter opening to secure the filter cassette within the filter slot.

17. The dryer appliance of claim 16, wherein a bottom surface of the cover defines a protruding structure, the protruding structure configured to push the filter cassette into engagement with the motor when installed.

18. The dryer appliance of claim 7, wherein the filter assembly further comprises a handle positioned on a top side of the filter cassette, the handle being accessible to a user via the filter opening when the filter cassette is inserted into the filter slot.

19. The dryer appliance of claim 7, wherein the filter medium comprises a metal screen.

20. The dryer appliance of claim 7, wherein the filter assembly further comprises:
a fan, the fan being operable to direct a flow of air across the second portion of the filter medium when the filter medium is in the first position or to direct the flow of air across the first portion of the filter medium when the filter medium is in the second position; and
a lint collection bin disposed downstream of the filter medium relative to the flow of air from the fan, the lint collection bin being configured for collecting lint blown off the filter medium by the flow of air from the fan.

* * * * *